United States Patent Office 3,149,081
Patented Sept. 15, 1964

3,149,081
CALCIUM PHOSPHATE CATALYSTS AND
METHOD OF PRODUCTION
Robert S. Bowman and Louis J. Piasecky, Pittsburgh, Pa., assignors, by mesne assignments, to The Baugh Chemical Company, Baltimore, Md., a corporation of Maryland
No Drawing. Filed Dec. 14, 1959, Ser. No. 859,118
9 Claims. (Cl. 252—437)

This invention relates to calcium phosphates modified by molecularly dispersed metal oxides that are of utility for various purposes including use as a catalyst, especially for dehydrogenation reactions. The invention relates also to a method of making such metal oxide modified calcium phosphates, and more particularly those more basic than tri-calcium phosphate and which for brevity are referred to as BCP.

A primary object of the invention is to provide calcium phosphates carrying dispersed metal oxides that are useful for various purposes and may embody a wide range of $CaO:P_2O_5$ ratios; which may be made readily by simple procedures from readily available materials; and which among other desirable physical properties possess good compression hardness and a high degree of thermal stability.

A further object is to provide modified calcium phosphates in accordance with the foregoing object that are especially useful for the dehydrogenation of organic compounds and which are promoted by a potassium compound.

Yet another object is to provide a method of making calcium phosphates carrying dispersed metal oxides in accordance with the foregoing objects that is simple, easily practiced with standard equipment, is applicable to plant-scale operation, makes use of readily available low cost materials, requires no washing steps while at the same time producing the phosphates free from undesirable salts and cations.

Still another object is to provide catalysts comprising a calcium phosphate having at least one metal dispersed therethrough in finely divided form, and a method of making such catalysts.

Other objects will appear from the following specification.

This invention is predicated upon our discovery that a solution of one or more metals, or one or more metal oxides, in aqueous phosphoric acid ($H_3PO_4$) will react with calcium hydroxide to yield a calcium phosphate carrying dispersed metal oxide. Metal salts, such as metal carbonates, the anions of which are expelled upon solution in phosphoric acid, can also be used as a source of metal oxide. The process is simple, and it is amenable to plant-scale manufacture. It also offers a considerable economic advantage in that no washing steps are required and low-cost raw materials can be used.

Our invention utilizes a unique property of phosphoric acid in that it acts to solubilize metals and metal oxides and form a transport medium for metal oxides which then reacts, in situ, with a calcium hydroxide slurry to form calcium phosphate. The resulting calcium phosphate, a substance the porosity of which can be thermally stabilized, then serves as a support for metal oxide deposited concurrently with formation of the phosphate. The two reactions are conducted in sequence, and can be depicted in general form as follows:

(1) $Me + P_2O_5 \xrightarrow{H_2O} MeO \cdot P_2O_5 + H_2$

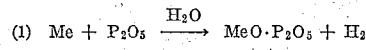

(2) $MeO \cdot P_2O_5 + Ca(OH)_2 \xrightarrow{H_2O} MeO + BCP$

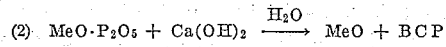

No attempt is made to define the exact stoichiometry involved in the above two general reactions, for variable ratios of metal or metal oxide to $P_2O_5$ (or $H_3PO_4$), and $P_2O_5$ to CaO (or $Ca(OH)_2$) can be employed. In the above general reactions, Me refers to a given metal, MeO is the metal oxide, and BCP is a calcium phosphate in which the weight ratio of CaO to $P_2O_5$ is 1.18:1.0 or higher. A weight ratio of 1.18:1.0 is correct for tri-calcium phosphate, and 1.32:1.0 corresponds to calcium hydroxyapatite, $Ca_{10}(OH)_2(PO_4)_6$. Other phosphate ratios may be used, up to that at which the phosphate is fully saturated with CaO, at which point the weight ratio is about 1.9:1.0. The course of reaction in Reaction No. 2 has been confirmed by X-ray analyses of the products.

Metals above hydrogen in the electromotive series, such as iron, cobalt, zinc, nickel, etc., can be dissolved directly in aqueous phosphoric acid. Metals below hydrogen, such as copper, silver and lead, can be solubilized by using an oxidizing agent. Thus, for example, the addition of the proper amount of nitric acid to the phosphoric acid will oxidize copper to copper oxide which then goes into phosphoric acid solution. The following reaction occurs in the case of copper:

$$3Cu + N_2O_5 + P_2O_5 \xrightarrow{H_2O} 3CuO \cdot P_2O_5 + 2NO$$
(in excess)

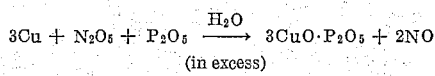

The nitric and phosphoric acids are depicted here, in the interests of convenience, as their anhydrides in aqueous solution. By proper adjustment of conditions, the reaction can be carried out in such a manner that a known amount of copper will be oxidized by a known amount of nitric acid. Since the principal by-product gas, nitric oxide, is volatile, a nitrogen free solution of cupric oxide in phosphoric acid is obtained. Similarly other oxidizing agents may be used with metals below hydrogen. For example, $CrO_3$ (chromic acid) with Cu. Any oxidizing agent that does not give a foreign anion that would require washing, such as hydrogen peroxide and t-butyl perbenzoate, may be used.

In preparing simple metal oxide impregnated calcium phosphates there is first prepared, in the manner just indicated, a solution of one or more desired metals in aqueous $H_3PO_4$. The exact concentration of acid and resultant metal oxide solution may vary widely depending upon the particular metal used, economy of time in forming the solution, minimizing the amount of water to be separated from the phosphate product, and other factors. For many purposes 70 percent $H_3PO_4$ is satisfactory.

The metal oxide-phosphoric acid solution is then added to a vigorously agitated aqueous slurry of calcium hydroxide at a rate such that the slurry remains alkaline. The precipitated phosphate is separated from the water, as by filtration or spray drying. The dried product is, if desired, pelletized and calcined, e.g. at about 500° C. in air. This procedure suffices for phosphates of, say, 1.32:1.0 weight ratio. As the phosphate approaches the 1.9:1.0 limit it becomes rather difficult to filter in plant scale operations. However, that difficulty may be overcome by first using the acid solution and lime slurry in proportions corresponding to tricalcium phosphate and then incrementally adding calcium hydroxide until the desired high ratio phosphate has been formed.

Products made in this manner may be used for agricultural purposes to supply lime, phosphorus, and, for example, trace elements to the soil. They may be used also as mold release agents, e.g. in the casting of copper billets. Another use of these materials is to provide a controlled source of color addition in the manufacture of bone china, or related dinnerware; the use of our new materials would insure a close control of well dispersed metal oxide, and absence of detrimental impurities such as might arise through the incomplete removal of anions.

We have found also that these metal oxide-BCP materials may be activated to have certain and important desirable characteristics as catalysts. First, they have high catalytic activity and selectivity in organic dehydrogenation reactions; second, they possess good compression hardness; and third, they have a high degree of thermal stability. The transformation of the metal oxide-BCP materials into suitable dehydrogenation catalysts is accomplished by specific, controlled processing. A description of this processing will be included in the following examples.

Two types of dehydrogenation catalysts have been developed from these metal oxide-BCP materials. One is an autoregenerative type, designed for continuous use at high temperatures in the presence of steam, as in the dehydrogenation of ethylbenzene and butenes-1 and -2 to styrene and 1,3-butadiene, respectively. The other has been developed for low temperature, selective dehydrogenation of alcohols to carbonyl compounds.

A description of the entire process for preparing the autoregenerative type dehydrogenation catalyst now follows:

Example 1

Step 1.—To 530 g. of dilute phosphoric acid containing 100 g. $P_2O_5$ pre-heated to 50° C. are added 43.1 g. of iron powder and 9.1 g. of chromic acid ($CrO_3$). The mixture is stirred gently and the temperature is allowed to rise to 80–85° C. After the evolution of hydrogen has ceased, the mixture is quenched with sufficient cold water to bring the temperature down to 55° C. or lower.

Step 2.—The above mixture is then added with vigorous stirring to a slurry of 176 g. calcium hydroxide (containing 133 g. CaO) in 1500 ml. of water.

Step 3.—The reaction mixture, after standing for one-half hour, is then treated to recover the product, as by conventional filtration, or by spraying onto a drum dryer. The dried product is then pulverized and calcined at 800–850° C. in an atmosphere of steam.

Step 4.—The calcined product is again pulverized, and then slurried in 500–600 ml. of water. A water solution of 41 g. of potassium hydroxide, as a promoter, is then added to the stirred slurry to obtain a high surface concentration of the compound for high surface alkalinity. $K_2CO_3$ may be used instead of KOH.

Step 5.—The alkalized product is then spray or drum dried, and then moistened with sufficient water to allow good extrusion into standard pellets, such as 3/16 inch diameter noodles.

Step 6.—The extruded product is dried, and then calcined at 600–700° C. in an atmosphere of steam to yield the finished catalyst.

The above process affords a catalyst with the following weight percent composition: 18.0% $Fe_2O_3$, 2.0% $Cr_2O_3$, 12.0% KOH, and 68.0% BCP (1.33 $CaO-P_2O_5$ weight ratio). The chromic oxide ($Cr_2O_3$) is formed from the chromic acid ($CrO_3$) by reduction during the reaction of the iron powder with phosphoric acid.

Hereafter, it is to be understood that all disclosed performance data on this type of catalyst were obtained under the following conditions: A continuous four-day test period at an average bed temperature of 600° C., using a 100 cc. bed of 3/16 inch pellets and a vaporized, pre-heated ethylbenzene feed stream composed of 90 mol percent water vapor and 10 mole percent ethylbenzene vapor passing through the catalyst bed at such a rate as to allow an average residence time within the total bed volume of 0.9 to 1.0 second. The linear velocity of the feed stream is about one foot per second. Styrene space yield is defined as lbs. styrene produced/cu. ft. of catalyst/hr.

It is also to be understood that all examples of catalyst formulations disclosed hereafter will include the six steps described above in Example 1.

The above catalyst (Example 1) over a four-day test period, affords an average space yield of 12.7 lbs. of styrene/cu. ft. of catalyst/hr. at a conversion level of 33 percent, using an average bed temperature of 600° C. The formation of by-product benzene and toluene corresponds to 5 percent of the styrene produced.

Example 2

A similarly prepared catalyst (Example 2), using 6.9 g. of green, commercial chromic oxide instead of the chromic acid, affords the same performance as the catalyst in Example 1.

Example 3

In this example a catalyst containing 20% $Fe_2O_3$, 3% $Cr_2O_3$, 10% KOH, and 67% BCP (1.33 $CaO-P_2O_5$ ratio) is prepared by using 530 g. dilute phosphoric acid (containing 100 g. $P_2O_5$) 48.6 g. iron powder, 10.4 g. green chromic oxide, 176 g. calcium hydroxide, and 34.8 g. KOH. This catalyst affords a 15.5 lb. styrene space yield, at a conversion level of 42 percent. The formation of benzene and toluene corresponds to 7 percent of the styrene produced.

Example 4

In this example a catalyst containing 26% $Fe_2O_3$, 4% $Cr_2O_3$ 12% KOH, and 58% BCP (1.33 $CaO-P_2O_5$ ratio) is prepared by using 530 g. dilute phosphoric acid (containing 100 g. $P_2O_5$), 73.0 g. iron powder, 21.3 g. chromic acid ($CrO_3$), 176 g. calcium hydroxide, and 48.2 g. KOH. This catalyst affords a styrene space yield of 18 lbs. at a conversion level of 50 percent. The formation of by-product benzene and toluene corresponds to 8 percent of the styrene produced.

Example 5

In this example a catalyst containing 18% $Fe_2O_3$, 2% $Cr_2O_3$, 12% KOH, and 68% tricalcium phosphate is prepared by using 530 g. dilute phosphoric acid (containing 100 g. $P_2O_5$), 41.4 g. iron powder, 6.5 g. $Cr_2O_3$ powder, 158 g. calcium hydroxide, and 38.8 g. KOH. This catalyst affords a styrene space yield of 11 lbs. at a conversion level of 30 percent. The formation of benzene and toluene corresponds to 4 percent of the styrene produced.

Example 6

In this example a catalyst containing 20% $Fe_2O_3$, 3% $Cr_2O_3$, 10% KOH, and 67% BCP (1.7 $CaO-P_2O_5$ ratio) is prepared by using 530 g. dilute phosphoric acid (containing 100 g. $P_2O_5$), 56.3 g. iron powder, 12.1 g. $Cr_2O_3$ powder, 224 g. calcium hydroxide, and 40.3 g. KOH. The catalyst affords a styrene space yield of 14.5 lbs., at a conversion level of 38 percent. The formation of by-product benzene and toluene corresponds to 5.5 percent of the styrene produced.

While the foregoing descriptive material lists certain preferred conditions, we are not confined to them. For example, $Fe_2O_3$ may be incorporated at 10 to 50 percent levels, the $Cr_2O_3$ at 0 to 50 percent, KOH at 5 to 20 percent, and the nature of the calcium phosphate may vary from tricalcium phosphate to a fully "saturated" basic calcium phosphate (where the $CaO-P_2O_5$ weight ratio is 1.7:1 to 1.9:1.0). Presently, we prefer the ratio of 1.32 which corresponds to calcium hydroxyapatite. We have also made an acceptable styrene catalyst containing only iron oxide, BCP, and potassium hydroxide. In this instance a catalyst composed of 26 percent ferric oxide, 12% potassium hydroxide, and 62 percent of a 1.33 ratio BCP was prepared, and was found to afford an average of 39.2 percent per pass conversion of ethylbenzene to styrene over a four day test at 590° C. The average styrene space yield was 15.0 lbs./cu. ft. of catalyst/hour. The formation of by-product benzene and toluene corresponds to 6 percent of the styrene produced. The catalyst was prepared by using 530 g. dilute phosphoric acid (containing 100 g. $P_2O_5$), 68.3 g. iron powder, 176 g. calcium hydroxide, and 45.1 g. potassium hydroxide following the general procedure described above.

A description of the second general type of dehydrogenation catalyst, useful for low temperature, selective dehydrogenation of alcohols to carbonyl compounds, and prepared by the "metal solution" technique of this invention, will now follow.

Example 7

Step 1.—A mass of copper metal turnings, from 200–400 g., is immersed in 530 g. of dilute phosphoric acid (containing 100 g. $P_2O_5$). An amount of 70% nitric acid (32.2 g.) sufficient to oxidize 27.3 g. of copper, is then added and the mixture is warmed to 50–55° C. A gentle evolution of gas (oxides of nitrogen, principally NO) then begins. The temperature is allowed to reach 75–85° C. where it is maintained until the evolution of gas ceases. To the dark blue solution of cupric oxide dissolved in phosphoric acid (presumably in the form of soluble monocupric phosphate) there is then added nickel, in the form of nickelous carbonate (2.2 g.). The complete solution of nickel is indicated when the evolution of $CO_2$ gas ceases.

Step 2.—The resultant blue-green solution (essentially nitrogen free) is then added with vigorous stirring to a slurry of 176 g. calcium hydroxide (contains 133 g. CaO) in 1500 ml. water.

Step 3.—After one half hour, the reaction mixture is filtered by conventional techniques, or it can be spray or drum dried. The dried product is then pulverized and calcined at 500–650° C. in an atmosphere of steam.

Step 4.—The calcined product is again pulverized, and then slurried in 500–600 ml. of water. A water solution of 15.6 g. KOH is then added to the stirred slurry.

Step 5.—The alkalized product is spray or drum dried and then moistened with sufficient water to allow good extrusion into standard pellets, such as 3/16 inch diameter noodles.

Step 6.—The extruded product, after drying, is transformed into the finished catalyst by calcining in air at 500–650° C.

The above process affords a catalyst with the following weight percent composition: 12% CuO, 0.5% NiO, 5.5% KOH, and 82% BCP (1.CaO–$P_2O_5$ ratio).

Variations in technique permit the use of nickel metal instead of nickel carbonate. In this instance, 1.1 g. of nickel powder is first dissolved in the dilute phosphoric acid. The copper turnings are then added to the nickel oxide phosphoric acid solution, and the solubilization of the copper is then performed as in step 1 above.

In the testing of an alcohol dehydrogenation catalyst, a feed stream of cyclohexanol vapor is employed at a bed temperature of 250° C., as measured by a thermocouple immersed one quarter of the bed height from the exit end of the bed. The cyclohexanol feed rate is such that vapor equivalent to 7.0–7.3 volumes of liquid cyclohexanol per total bed volume pass through the bed per hour. Thus, the residence time is of the order of 0.1 second, and the feed gas linear velocity is about 4 ft. per second. The major dehydrogenation product is the ketone, cyclohexanone, and the yield is calculated in terms of lbs. of cyclohexanone produced/cu. ft. of catalyst/hr. This term is called the space yield.

Catalysts of the type described in Example 7 when tested using 50 cc. beds of catalyst pellets afford cyclohexanone space yields in the 260 to 280 lb. range, at 60 to 70 percent conversion levels. These figures represent averages over 100 minute on-cycle times. Phenol appears as the only detectable by-product, to the extent of 1 percent or less.

Catalyst activity during on-stream declines slowly so that regeneration is desirable after about 2 to 4 hours. The length of on-stream time is a function of catalyst structure and feed stream purity. Catalyst regeneration is accomplished simply and efficiently by air-burning at bed temperatures of around 300° C. or higher for about one-half hour. The rate of air admission to the bed during the regeneration cycle should be so adjusted that the rise in bed temperature does not exceed about 200° C. (i.e., the peak bed temperature remains below 500° C.).

Useful compositional ranges for catalysts of this latter type include 2–20% CuO, 0–5% NiO, 0–15% KOH. The remainder in all instances is calcium phosphate. The useful range of calcium phosphate composition is from 1.18 CaO–$P_2O_5$ wt. ratio (tricalcium phosphate) to a "saturated" basic calcium phosphate in which the CaO–$P_2O_5$ weight ratio is 1.7:1.0 to 1.9:1.0. At present we prefer a 1.32 ratio basic calcium phosphate (calcium hydroxyapatite). Other metal oxides which can be incorporated conveniently by the phosphoric acid solution of the metals include the oxides of cobalt and zinc.

As an additional example of the versatility of the "phosphoric acid solution" technique, the preparation of a copper-chromite type catalyst will now be described. In this instance chromic acid in phosphoric acid solution is employed as the oxidizing agent to oxidize metallic copper to cupric oxide, and it consequently appears as the chromic oxide component of a copper-chromite. The phosphoric acid solution of the cupric and chromic oxides is then reacted with an aqueous slurry of calcium hydroxide to form copper-chromite dispersed within a calcium phosphate. The reactions can be depicted as follows:

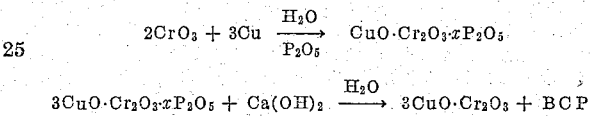

$$2CrO_3 + 3Cu \xrightarrow[P_2O_5]{H_2O} CuO \cdot Cr_2O_3 \cdot xP_2O_5$$

$$3CuO \cdot Cr_2O_3 \cdot xP_2O_5 + Ca(OH)_2 \xrightarrow{H_2O} 3CuO \cdot Cr_2O_3 + BCP$$

In an example of the above process, 20.0 g. of chromic acid ($CrO_3$) were dissolved in 488 g. of a phosphoric acid containing 100.0 g. of $P_2O_5$ at a temperature of 30°–40° C. Copper powder, 20.0 g., was then added, and the stirred mixture was heated to gentle boiling, at 101–102° C. After about one hour the clear blue-green solution was decanted from the unreacted copper powder (0.7 g.) and added with good stirring to a slurry of 165 g. of $Ca(OH)_2$ in 1500 ml. of water. After one-half hour, the mixture was filtered in order to remove the water (since no undesirable, soluble materials are present; the water can also be removed by spray or drum drying). The product is then dried in an air oven at 105–110° C., then crushed and pelletized into 3/16" pellets. The pellets are then heated in air at 1000° F. for one hour to form the finished catalyst, which contains 15 weight percent copper-chromite and 85 percent of a 1.25 CaO–$P_2O_5$ weight ratio BCP. Copper-chromite catalysts are employed in selective hydrogenation-dehydrogenation reactions.

A cupric oxide-BCP-potassium hydroxide has been prepared as a hydrogenation catalyst. This catalyst was prepared by the technique described in Example 7, using 31.9 g. of 70.7 nitric acid to oxidize 24.6 g. of copper, 488 g. of dilute phosphoric acid containing 100.0 g. $P_2O_5$, 176 g. of calcium hydroxide, and 15.5 g. of potassium hydroxide. The final composition is 11.0% cupric oxide, 5.5% potassium hydroxide, and 83.5% 1.33 ratio BCP.

A cupric oxide-calcium phosphate has been prepared, for use in the vapor phase hydrolysis of chlorobenzene to phenol. In this instance, the catalyst composition was 0.5% cupric oxide and 99.5% 1.20 ratio calcium phosphate (i.e., essentially tricalcium phosphate). It was used successfully to convert chlorobenzene to phenol at an average of 12 percent per pass conversion over a six hour period at a catalyst bed temperature of 475° C., using a feed stream composed of 6–7 moles of steam per mole of chlorobenzene, at a contact time of about one second. The conversion efficiency (or selectivity) is 90 percent. This catalyst was prepared by adding 27.3 g. of a stock cupric oxide-phosphoric acid solution containing 1.0 g. cupric oxide and 3.6 g. $P_2O_5$ to 470 g. of dilute phosphoric acid containing 96.4 g. of $P_2O_5$. The entire solution was then added with good stirring to a slurry of 155 g. calcium hydroxide in 1200 ml. water. After about one-half hour, the mixture was filtered to remove the water (spray or drum drying would also be satisfactory), dried in an air oven at 105–110° C., and then pelletized into 3/16 inch pellets. The catalyst was obtained in final form by retorting the pellets in air at 1000° F. for one hour.

Instead of adding the alkaline potassium compound, such as KOH or $K_2CO_3$, as described above it may be added to the slurry of BCP carrying metal oxide. In this way steps 3 and 4 of the foregoing examples are eliminated. Alkalinity may be supplied also by potassium nitrate which will be decomposed during calcination of the pellets.

It is evident from the description of the preparative processes for the two types of dehydrogenation catalysts that the basic technique provided by the invention has general application wherever it is desirable to incorporate finely dispersed metal oxides with and on calcium phosphates. The advantages, in addition to those already mentioned in regard to catalyst performance and costs, include the important fact that no washing steps are required anywhere in the entire process, for no undesirable salts or anions are formed from, or are present in, the reactants from which these metal oxide-BCP materials are made. Thus, manufacture on any scale, from laboratory size to full-scale plant equipment, requires only simple, straightforward techniques, with a minimum of man-hours of labor. Further, metal oxide-calcium phosphates can be made over a wide range of $CaO-P_2O_5$ ratios. We have discovered, therefore, a flexible, general method for manufacturing finely dispersed metal oxides in calcium phosphate.

A further and important aspect of the invention is that it provides for the production of catalysts composed of calcium phosphate carrying one or metals having catalytic activity and whose oxides are reducible and that are useful as catalysts. This is accomplished readily by subjecting compositions prepared as described above to an atmosphere of hydrogen or other reducing agent. Thereby the metal oxide is reduced with formation of metal dispersed through the phosphate in finely divided form especially adapted for catalytic purposes.

According to the provisions of the patent statutes, we have explained the principle and mode of practicing our invention and have described what we now consider to represent its best embodiment. However, we desire to have it understood that, within the scope of the appended claims, the invention may be practiced other than as specifically described.

We claim:

1. That method of making calcium orthophosphate having dispersed therein at least one metal oxide, comprising making an aqueous solution of at least one metal selected from the group consisting of cobalt, copper, iron, nickel, zinc, and chromium in orthophosphoric acid, adding said solution to an agitated aqueous slurry of calcium hydroxide at a rate such that the slurry remains alkaline, the proportions of said acid solution and calcium hydroxide forming a calcium orthophosphate of $CaO:P_2O_5$ ratio from 1.18:1 to 1.9:1, and thereby precipitating said phosphate from the solution with concurrent dispersion of oxide of said material through said phosphate, recovering the precipitated material, and drying it.

2. A method according to claim 1 in which there is added to the precipitated material an inorganic potassium salt decomposable $K_2O$ by heat to potassium oxide, drying the alkalized product, forming pellets therefrom, and calcining these pellets in an atmosphere of steam.

3. A method according to claim 1, in which the dried product is subjected to a reduction medium with conversion of the metal oxide to the metallic state.

4. That method of making a calcium orthophosphate catalyst comprising the steps of dissolving iron metal in aqueous orthophosphoric acid containing in solution an oxide of chromium, adding the resultant solution to an agitated aqueous slurry of calcium hydroxide at a rate such that it remains alkaline, the acid and calcium hydroxide being used in amounts to form an orthophosphate of $CaO:P_2O_5$ ratio from 1.18:1 to 1.9:1 and thereby precipitating calcium orthophosphate while concurrently dispersing iron and chromium oxides in it, separating the phosphate from water and calcining it at about 800° to 850° C. in an atmosphere of steam, forming a slurry of calcined material in water and adding to it an inorganic potassium compound decomposable $K_2O$ by heating to potassium oxide, drying the alkalized product, forming pellets therefrom, and calcining the pellets at about 600° to 700° C. in an atmosphere of steam.

5. That method of making a calcium orthophosphate catalyst comprising the steps of dissolving copper metal in orthophosphoric acid containing in solution nitric acid and a nickel compound decomposable by heat to nickel oxide, adding the resultant solution to an agitated aqueous slurry of calcium hydroxide at a rate such that it remains alkaline, the proportions of acid and calcium hydroxide being such as to form a calcium orthophosphate of $CaO:P_2O_5$ ratio from 1.18:1 to 1.9:1 and thereby precipitating said phosphate while dispersing copper and nickel oxides in it, separating the phosphate from water and calcining it at about 500° to 650° C. in an atmosphere of steam, forming a slurry of the calcined material in water and adding to it an inorganic potassium compound decomposable by heat to potassium oxide, drying the alkalized product, forming pellets therefrom, and calcining the pellets at about 500° to 650° C. in an atmosphere of steam.

6. As a new composition, calcium orthophosphate of $CaO:P_2O_5$ ratio from 1.18:1 to 1.9:1 having dispersed therethrough an oxide of at least one metal soluble in phosphoric acid and selected from the group consisting of cobalt, copper, iron, nickel, zinc and chromium.

7. As a new composition, calcium orthophosphate catalyst of $CaO:P_2O_5$ ratio from 1.18:1 to 1:91.1 having dispersed therethrough an oxide of iron, together with by analysis $K_2O$ equivalent to about 5 to 20 percent of an alkaline potassium compound decomposable by heat to potassium oxide.

8. As a new composition, calcium orthophosphate catalyst of $CaO:P_2O_5$ ratio from 1.18:1 to 1.9:1 having dispersed therethrough, by weight, about 10 to 50 percent of iron oxide, 0 to 50 percent of chromium oxide, and by analysis $K_2O$ equivalent to about 5 to 20 percent of an alkaline potassium compound decomposable by heat to potassium oxide.

9. As a new composition, calcium orthophosphate catalyst of $CaO:P_2O_5$ ratio from 1.18:1 to 1.9:1 having dispersed therethrough, by weight, about 2 to 20 percent of copper oxide, 0 to 5 percent of nickel oxide, and by analysis $K_2O$ equivalent to about 0 to 15 percent of an alkaline potassium compound decomposable by heat to potassium oxide.

References Cited in the file of this patent

UNITED STATES PATENTS

| | | |
|---|---|---|
| 1,882,712 | Andrussow et al. | Oct. 18, 1932 |
| 2,291,609 | Cobbs et al. | Aug. 4, 1942 |
| 2,338,445 | Laucht | Jan. 4, 1944 |
| 2,542,813 | Heath | Feb. 20, 1951 |
| 2,631,102 | Hubbard et al. | Mar. 10, 1953 |
| 2,763,702 | Amos et al. | Sept. 18, 1956 |
| 2,813,137 | Twaddle et al. | Nov. 12, 1957 |
| 2,816,081 | Heath et al. | Dec. 10, 1957 |
| 2,829,165 | Coussemant | Apr. 1, 1958 |
| 2,920,049 | Romanovsky et al. | Jan. 5, 1960 |

UNITED STATES PATENT OFFICE
CERTIFICATE OF CORRECTION

Patent No. 3,149,081                          September 15, 1964

Robert S. Bowman et al.

It is hereby certified that error appears in the above numbered patent requiring correction and that the said Letters Patent should read as corrected below.

Column 5, line 39, for "(1.CaO-$P_2O_5$ ratio)" read -- (1.33 CaO-$P_2O_5$ ratio) --; column 6, line 24, for "$CuO \cdot Cr_2O_3 \cdot xP_2O_5$" read -- $3CuO \cdot Cr_2O_3 \cdot xP_2O_5$ --.

Signed and sealed this 19th day of January 1965.

(SEAL)
Attest:

ERNEST W. SWIDER                        EDWARD J. BRENNER
Attesting Officer                           Commissioner of Patents